US007954249B1

(12) United States Patent
Perkey

(10) Patent No.: US 7,954,249 B1
(45) Date of Patent: Jun. 7, 2011

(54) E-Z RISER STAIR GUIDE

(75) Inventor: Thomas Raymond Perkey, Kansas City, MO (US)

(73) Assignee: E-Z Riser, Inc., Kansas City, MO (US)

( * ) Notice: Subject to any disclaimer, the term of this patent is extended or adjusted under 35 U.S.C. 154(b) by 0 days.

(21) Appl. No.: 12/798,786

(22) Filed: Apr. 9, 2010

(51) Int. Cl.
*B43L 7/027* (2006.01)
*G01B 3/02* (2006.01)

(52) U.S. Cl. .............................. 33/427; 33/562; 33/476

(58) Field of Classification Search ............ 33/419–421, 33/427, 429, 452, 464, 474, 476, 483–485, 33/494, 526, 527, 562, 565, 566, 340, 456, 33/459, 460, 809; 52/182, 183, 191
See application file for complete search history.

(56) References Cited

U.S. PATENT DOCUMENTS

| | | | | | |
|---|---|---|---|---|---|
| 164,008 | A * | 6/1875 | Kirkpatrick | ..... | 33/427 |
| 341,126 | A * | 5/1886 | Boyer | ..... | 33/420 |
| 493,048 | A * | 3/1893 | Van Alstine | ..... | 33/420 |
| 539,534 | A * | 5/1895 | McKinny | ..... | 33/474 |
| 796,030 | A * | 8/1905 | Baumgartner | ..... | 33/420 |
| 858,431 | A * | 7/1907 | Wiegmann | ..... | 33/420 |
| 947,422 | A * | 1/1910 | Sherry | ..... | 33/427 |
| 1,527,647 | A * | 2/1925 | Heinen | ..... | 33/420 |
| 3,478,434 | A * | 11/1969 | Catalano | ..... | 33/418 |
| 4,742,619 | A * | 5/1988 | Swanson | ..... | 33/474 |
| 4,833,791 | A * | 5/1989 | Campbell | ..... | 33/562 |
| 4,882,846 | A * | 11/1989 | Reed | ..... | 33/464 |
| 5,388,340 | A * | 2/1995 | Marty | ..... | 33/421 |
| 5,440,818 | A * | 8/1995 | Mailhot | ..... | 33/452 |
| 5,692,357 | A * | 12/1997 | McCain | ..... | 52/749.1 |
| 5,727,325 | A * | 3/1998 | Mussell | ..... | 33/429 |
| 6,260,283 | B1 * | 7/2001 | Abernathy et al. | ..... | 33/419 |
| 7,627,955 | B1 * | 12/2009 | Perkey | ..... | 33/427 |

* cited by examiner

*Primary Examiner* — Amy Cohen Johnson

(57) ABSTRACT

A template guide which performs and simplifies the task of layout for stair stringers. This accomplishment has previously been made by the use of multiple tools including the framing square, multipurpose square, and speed square as well as others. The said template of the present invention features an adjustable riser that can be secured for the exact dimension of any rise calculated to be between 6" and 7¾". The said template of the present invention also features an adjustable tread that can be secured for the exact dimension of any tread length, calculated to be between 9¼" and 11⅛". The said template is configured as such to accommodate the unskilled craftsman as well as the experienced tradesman.

1 Claim, 5 Drawing Sheets

E-Z RISER STAIR GUIDE

CROSS REFERENCE TO RELATED APPLICATIONS

This application claims the benefit of U.S. Pat. No. 7,627,955 to Perkey, known as the Stringer Guide Template.

FIELD OF THE INVENTION

The present invention is a tool with the actual shape and size of a portion of a stair stringer. The present invention also has an adjustable feature, which allows the calculated dimension of rise to be set and secured. The said adjustable feature, for the riser dimension, is adjusted by sliding Section #1, Part #1 into Section #2, Part #2, using increments labeled #7 on said present invention. Then secure by tightening Wing nuts #17 onto machine pressed threaded Stud #10 to hold Section #1 secure to Section #2. The said present inventions function is to simplify and speed up the process, whereby said stair stringers are laid out ready for cutting to final shape.

BACKGROUND OF THE INVENTION

This present invention is a carpentry tool used for the complete layout of stair stringers. The said tool relates to the performances of other tools such as the L-shaped framing square, multipurpose square, speed square, and various other tools.

DESCRIPTION OF THE PRIOR ART

Various devices have been designed in the past to perform the task of laying out stair stringers, but none are as fast and simple as this present invention.

The L-shaped framing square is the most universally recognized tool for performing this task. When using said tool for layout of stair stringers, its use requires the user to align two marks of measurement, one on each leg of the tool. This is often a somewhat clumsy method of operation, for after one number is aligned and when the other leg is moved to align the second number, it often causes the first leg to shift off position, making it necessary to realign a second and sometimes a third time. The said tool also must be spun multiple directions for final layout marks, which can be confusing to the novice craftsman.

Triangular shaped squares such as U.S. Pat. No. 4,742,619 to Swanson, commonly known as "speed squares", are simply too short for accurate layout increments pertaining to stair stringers.

The multipurpose square U.S. Pat. No. 5,727,325 Barry D Mussell, has the problem of being too short for layouts of stair stringers made to receive 2"×12" treads. It also has an edge on the handle that projects out from the faces of body, making it extremely difficult to get accurate markings needed for said layouts.

The Stringer Guide Template U.S. Pat. No. 7,627,955 Thomas R Perkey, has the problem of being unable to adjust the tread length and also has a weakness in the structure when the tool is separated.

From the operational descriptions and drawings of this present invention, it becomes evident that the said invention in the embodiments shown by FIGS. 1-7, that said present invention simplifies, increases speed of layout, and makes a more accurate layout for stair stringers.

BRIEF SUMMARY OF THE INVENTION

Many prior art squares perform a variety of specialized functions, however, none of them are able to execute the process of stair stringer layout as fast and effectively as this present invention.

It is the object of the present invention to overcome the shortcomings of the prior art squares and the more traditional methods of laying out a stair stringer. Whereby, the said present inventions unique shape, which is likened to the actual shape of a stair stringer, gives said present invention a simpler, faster, and more accurate method of layout.

DETAILED DESCRIPTION OF THE INVENTION

Figure 1:
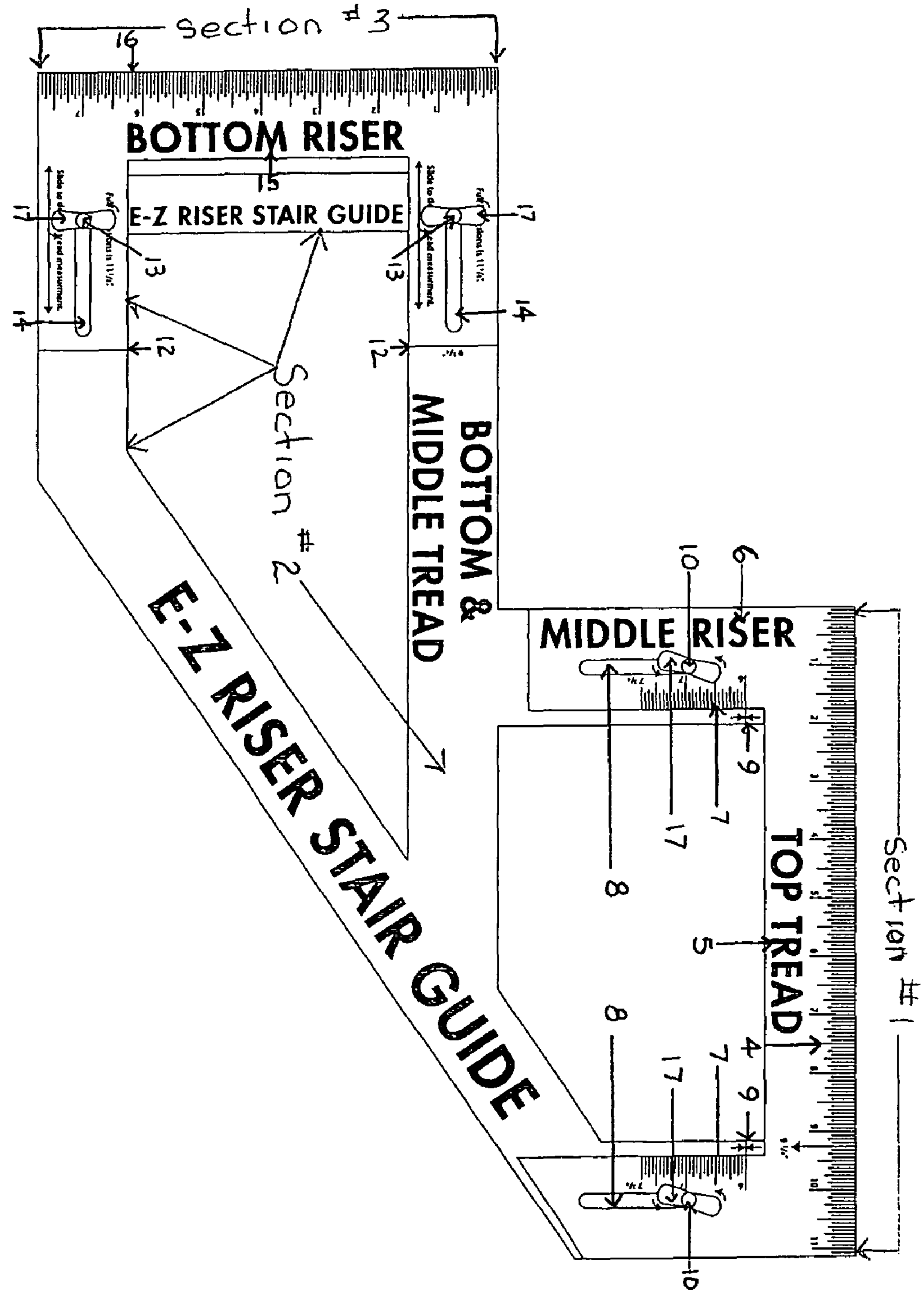
FIG. 1 Shows a face view of one embodiment of the present invention in its closed position.
Figure 2:
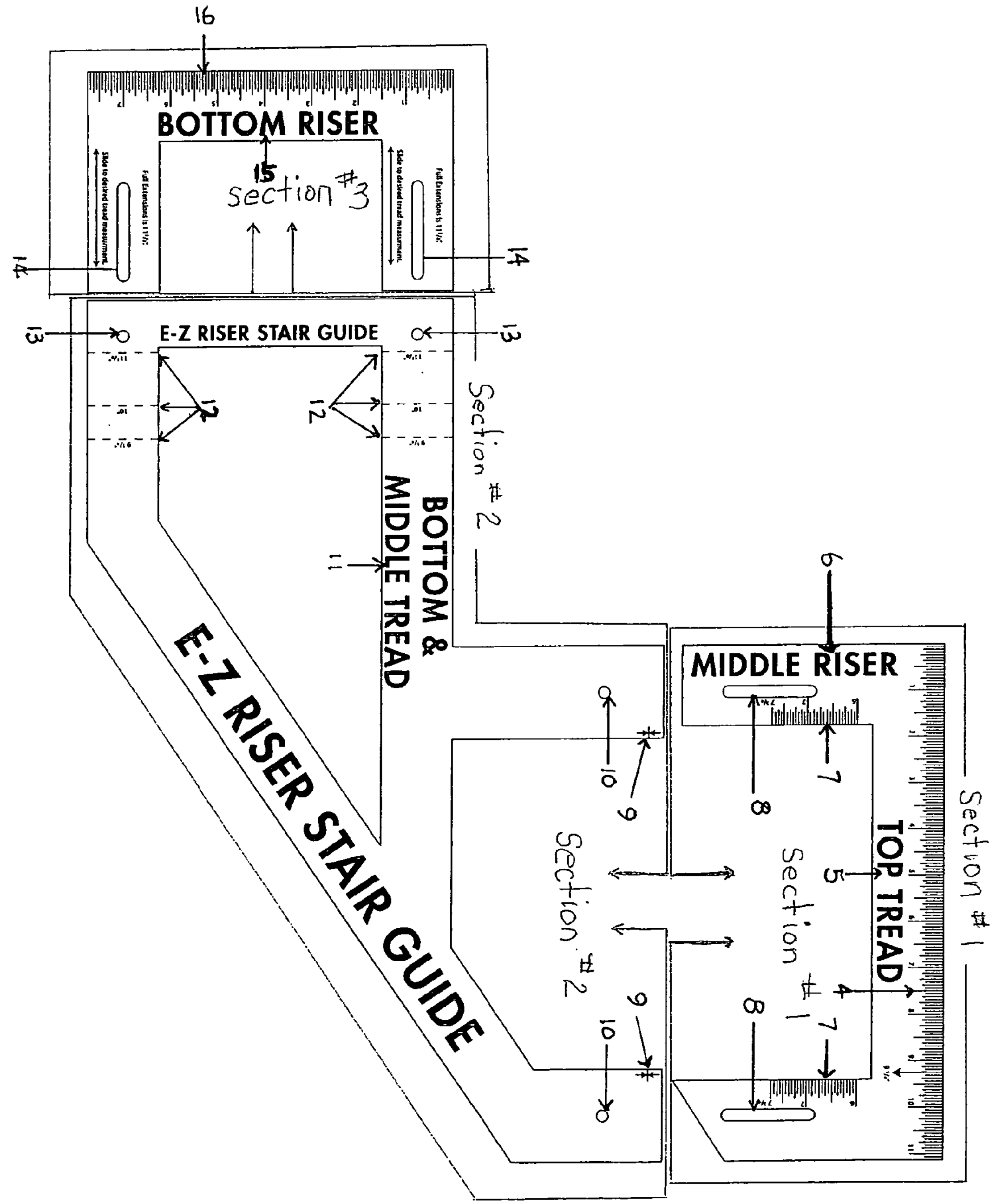
FIG. 2 Shows a face view of the embodiment of FIG. 1 in its opened position.
Figure 3:
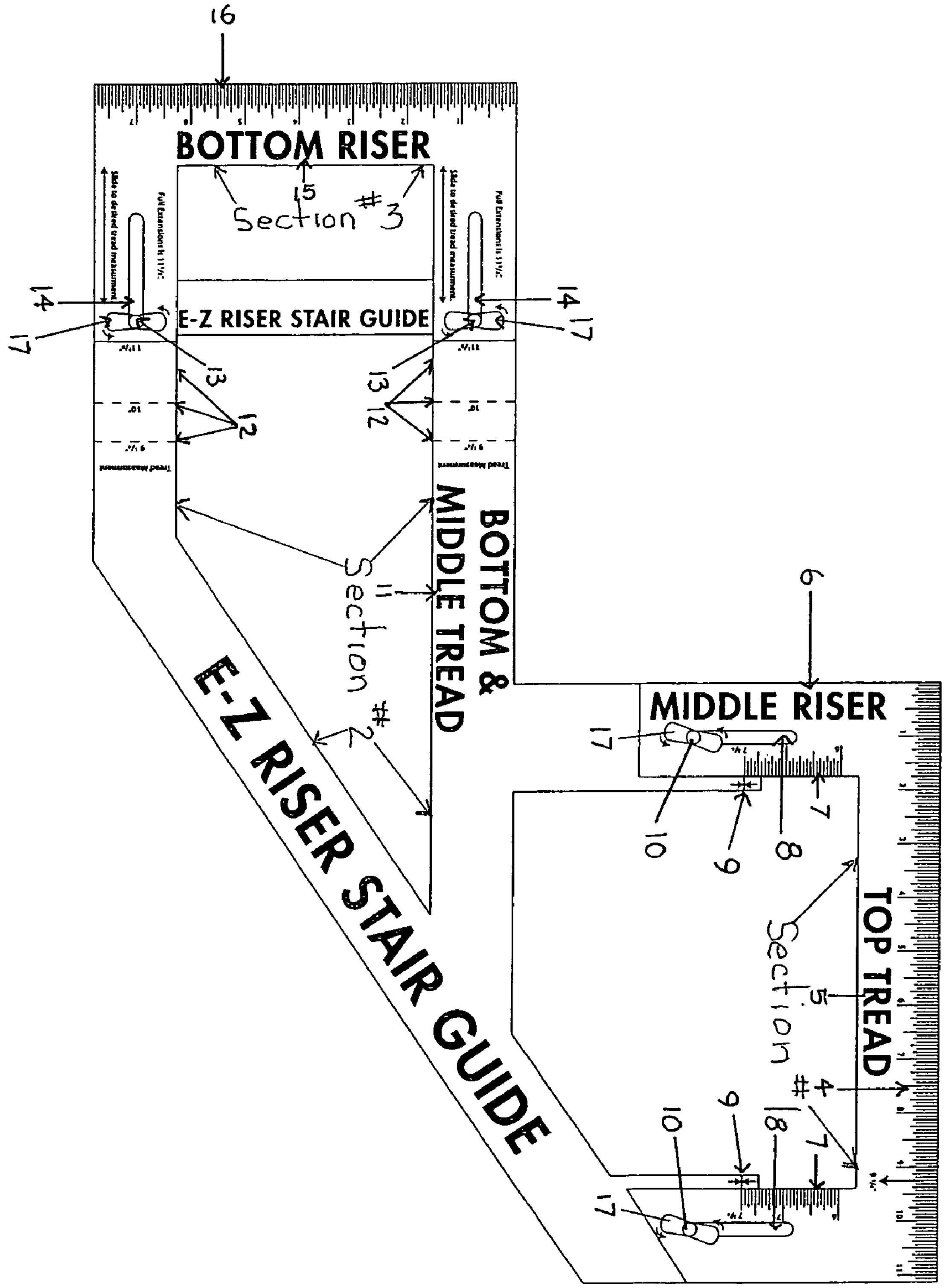
FIG. 3 Shows a face view of the embodiment of FIG. 1 in its extended position, both rise and tread.
Figure 4:
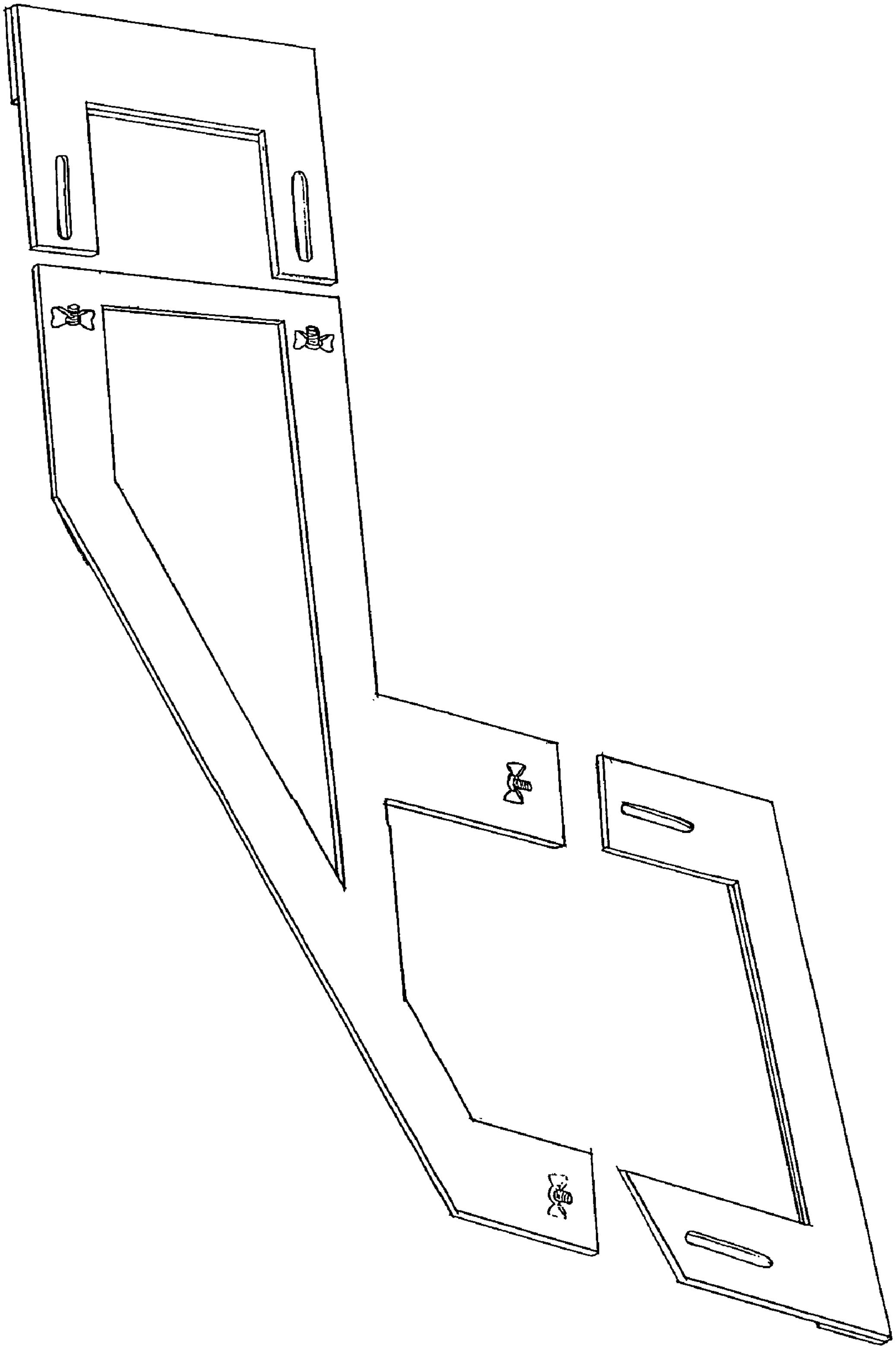
FIG. 4 Is a perspective view of the embodiment of FIG. 2 in it's opened position.

A template guide 1A, one embodiment of the present invention is illustrated in FIG. 1 (a closed face view), FIG. 2 (an opened face view), FIG. 3 (an extended face view), and FIG. 4 (a perspective view). This tool may be fabricated of any suitable material, but is to be commonly made of either aluminum or injected mold plastic. The said template is labeled on one side, only, so user will not be confused by reversing said tool.

Figure 5:
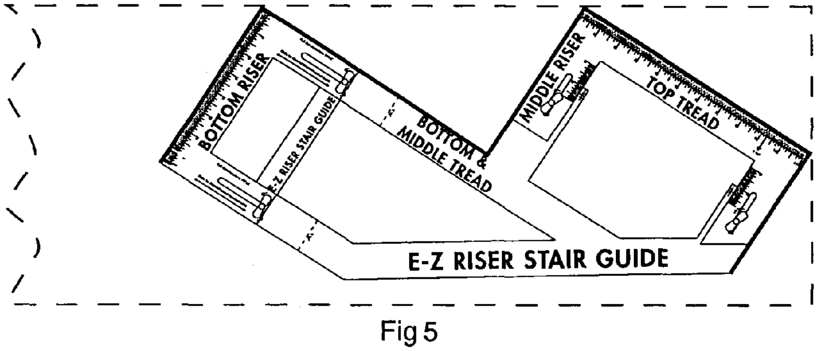
FIG. 5 Illustrates the embodiment of FIG. 1 being used to layout the top step of stair stringer, then continuing on, marking the beginning of middle steps.
Figure 6:
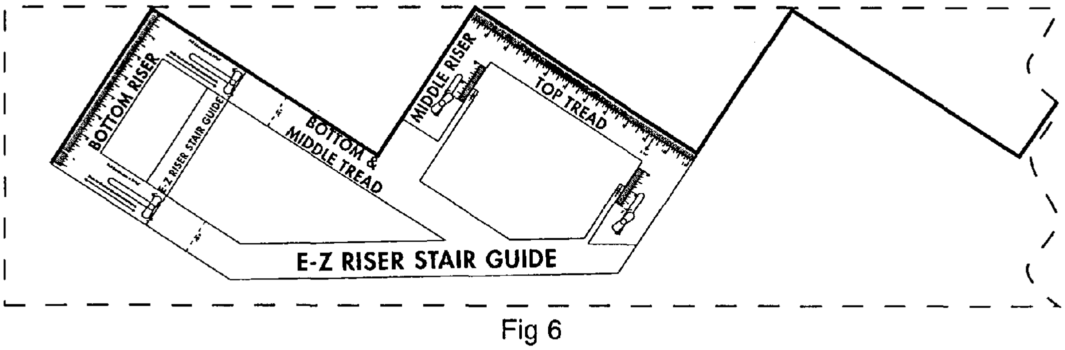
FIG. 6 Illustrates the embodiment of FIG. 1 being used to layout the continuation of said middle steps of said stair stringer.
Figure 7:
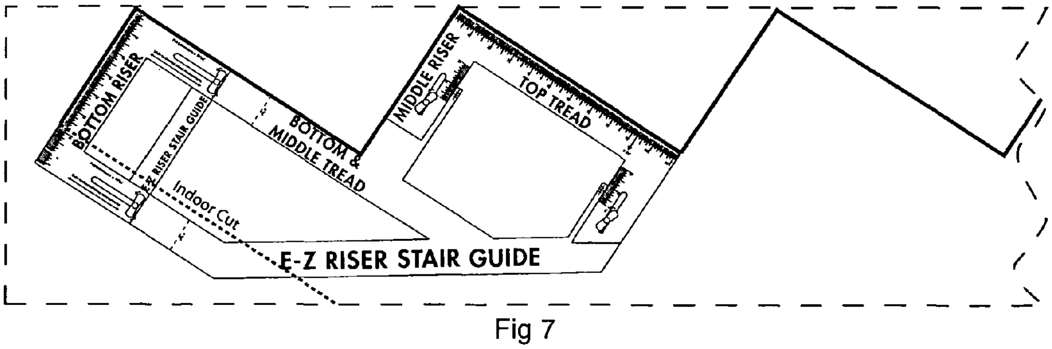
FIG. 7 Illustrates the embodiment of FIG. 1 being used to mark final layout of bottom step of said stair stringer.

FIG. 1 shows a template with stair stepped body so user can visualize the actual look of finished stair stringer. FIG. 2, an embodiment of FIG. 1, shows said template in its opened position, thus allowing the user to recognize the adjustable features of the said template. Once the rise height and tread length of stairs has been determined the square can then be fixed to those dimensions, creating the previous drawing in FIG. 1 to be accurate. FIG. 4, an embodiment of FIG. 1, shows a perspective view of the said present invention, giving the viewer an opportunity to see an angle of how part #1 and part #3 will slide into part #2. The said tool as illustrated in FIG. 5 can be placed on the desired dimensional lumber at the right end of material. The tips of the said template are to be placed flush with the edge of board, then marking around four sides of said template can be drawn, starting from right to left. FIG. 6 an embodiment of FIG. 1 shows the method of sliding said template from right to left, replacing tips of said template back on same edge of said material for marking of middle steps. FIG. 7 an embodiment of FIG. 1 shows the method of sliding the said template from right to left and replacing the tips of said template on same edge of lumber for final marking of the bottom step. (Note: outdoor stairs allow for stair stringer to be 1½" below ground, indoor stairs, the 1½" must be subtracted from actual height dimension of bottom riser and marked accordingly for final level mark, at bottom of said stair stringer). Once this final layout is completed, said stair stringers are ready to be cut to final shape.

This present invention can be either laser cut out of various materials, such as, aluminum, steel, etc. or made by injecting plastic into an injection mold.

The increments for top tread allow user to identify measurements on said tread. Labeled #4 on drawings 1-7.

The increments for adjusting rise are measurements allowing rise to be established between 6 inches and 7¾ inches. Labeled #7 on drawings 1-7.

The slots, labeled #14, in legs of small U-shaped member labeled #3 allows part #3 to be adjusted to part #2 and secured by wing nuts labeled #17.

The slots, labeled #8, in legs of large U-shaped member labeled #1 allows part #1 to be adjusted to part #2 and secured by wings nuts, labeled #17.

All four legs of part #2 have embedded threaded studs labeled #10 and #13 and are machine pressed into the body of part #2.

The straight lines with arrows below and above label #9 are the control line when the said present invention is being adjusted to desired height of rise, this line must be aligned evenly with calculated riser height by increments labeled #7.

The increments labeled #12 are measurements to be used when adjusting tread length.

The riser indications are labels to indicate the riser of stair stringer. Labeled #6 on drawings 1-7.

Label for bottom riser indicates the bottom rise of stair stringer labeled #15 on drawing 1-7.

Increments for bottom riser are measurements so user can mark proper height of bottom riser of stair stringer. Labeled #16 on drawing 1-7.

Label for bottom and middle tread identifies one part of present invention. Labeled #11 on drawings 1-7.

Label for top tread signifies to the user the first step of stair stringer. Labeled #5 on drawings 1-7.

Wing nuts for securing part #1 and part #3 to part #2 of stair stringer at desired dimension. Labeled #17 on drawings 1-7.

The large U-shaped member of the present invention, shown as section #1. Labeled part #1 on drawings 1-7.

The small U-shaped member of the present invention, shown as section #3. Labeled part #3 on drawing 1-7.

The main body of the present invention, shown as section #2. Labeled part #2 in drawings 1-7.

CHARACTER OF NUMBERS

Functioning Parts of the Invention (1) The large U-shaped member
(2) The main body
(3) The smaller U-shaped member
(4) Increments for top tread
(5) Label for top tread
(6) Label for middle riser
(7) Riser indications
(8) The slots in legs of large U-shaped member
(9) Control line with arrows below and above
(10) Threaded studs for large U-shaped member
(11) Label for bottom and middle tread
(12) Tread indications
(13) Threaded studs for small U-shaped member
(14) The slots in legs of small U-shaped member
(15) Label for bottom riser
(16) Increments for bottom riser
(17) Wing Nuts

What is claimed is:

1. An adjustable stringer guide template comprising:

a first section slidably connected to a second section;

wherein said first section comprises a U-shaped member having first and second parallel legs and a perpendicular leg connecting the first and second parallel legs;

wherein said second section comprises third and fourth parallel legs which slidably engage the first and second parallel legs of the first section, respectively; a fifth leg extending perpendicularly from the third parallel leg and away from the fourth parallel leg; a sixth leg extending perpendicularly from the fifth leg and parallel to the third leg; a seventh leg extending perpendicularly from the sixth leg and parallel to the fifth leg; and an angled member extending angularly from the fourth parallel leg of the second section and connected to the seventh leg;

and a third section adjustably connected to said second section;

wherein said third section comprises a U-shaped member having eighth and ninth parallel legs and a tenth perpendicular leg connecting the eighth and ninth parallel legs; said eighth and ninth parallel legs slidably engage said fifth and seventh parallel legs of said second section;

wherein said first leg, second leg, and tenth leg include riser indicia thereon and said perpendicular leg of said first section includes tread indicia thereon;

whereby sliding the first section relative to the second section adjusts the adjustable stringer guide template to a desired riser dimension of a stringer for a staircase;

whereby sliding said third section relative to said second section adjusts the adjustable stringer guide template to a desired tread dimension of a stringer for a staircase.

* * * * *